United States Patent [19]

Stallwitz et al.

[11] Patent Number: 5,797,707
[45] Date of Patent: Aug. 25, 1998

[54] CUTTING INSERT

[75] Inventors: Erwin Stallwitz, Lichtenau; Helmut Storch, Rothenburg, both of Germany

[73] Assignee: Widia GmbH, Essen, Germany

[21] Appl. No.: 687,368

[22] PCT Filed: Jan. 23, 1995

[86] PCT No.: PCT/DE95/00079

§ 371 Date: Jul. 30, 1996

§ 102(e) Date: Jul. 30, 1996

[87] PCT Pub. No.: WO95/20451

PCT Pub. Date: Aug. 3, 1995

[30] Foreign Application Priority Data

Jan. 31, 1994 [DE] Germany ............... 44 02 759.1

[51] Int. Cl.$^6$ ............................................. B23B 27/14
[52] U.S. Cl. ............................................. 407/114; 407/113
[58] Field of Search ........................... 407/116, 115, 407/114, 113

[56] References Cited

U.S. PATENT DOCUMENTS

| | | | |
|---|---|---|---|
| 4,318,645 | 3/1982 | McCreery | 407/114 |
| 4,359,300 | 11/1982 | Harzra et al. | 407/114 |
| 5,116,167 | 5/1992 | Niebauer | 407/114 |
| 5,123,788 | 6/1992 | Friedrichs et al. | |
| 5,372,463 | 12/1994 | Takahashi | 407/114 |
| 5,577,867 | 11/1996 | Paya | 407/114 |

FOREIGN PATENT DOCUMENTS

| | | |
|---|---|---|
| 0 046 511 A2 | 3/1982 | European Pat. Off. . |
| 0 278 083 A1 | 8/1988 | European Pat. Off. . |
| 0 387 636 A2 | 7/1990 | European Pat. Off. . |
| 0 506 078 A3 | 9/1992 | European Pat. Off. . |
| 0 517 019 A1 | 12/1992 | European Pat. Off. . |
| 0 568 512 A1 | 11/1993 | European Pat. Off. . |
| 2 561 960 | 10/1985 | France . |
| 663 783 | 7/1938 | Germany . |
| 31 48 535 A1 | 7/1983 | Germany . |
| 41 18 070 A1 | 12/1992 | Germany . |
| 41 41 368 A1 | 6/1993 | Germany . |
| 44 02 759 A1 | 8/1995 | Germany . |

OTHER PUBLICATIONS

1991 Derwent Publications Ltd. Abstracts of Soviet Union patent 1611-583-A. 25 Oct. 1988.

*Primary Examiner*—Daniel W. Howell
*Assistant Examiner*—Mark Williams
*Attorney, Agent, or Firm*—Herbert Dubno

[57] ABSTRACT

A cutting insert has a flat body (2) and at least one supporting surface (3) and a cutting edge (4, 5), to which are associated at least one first face (7, 8) and a flank (9, 10). In order to increase the volume of metal removed, at least one chipping bulge (11) is arranged on the first face (7, 8).

4 Claims, 5 Drawing Sheets

1

CUTTING INSERT

CROSS REFERENCE TO RELATED APPLICATIONS

This application is a national stage application of PCT/DE 95/00079 filed 23 Jan. 1995, published as WO95/20451 Aug. 3, 1995 and based, in turn, upon German National application P 4402759.1 of 31 Jan. 1994 under the International Convention.

FIELD OF THE INVENTION

The invention relates to a cutting insert for machinery with a plate-liked body, at least one support surface and a cutting edge, each associated with at least one face and a flank.

BACKGROUND OF THE INVENTION

Cutting inserts of the mentioned kind are known in large numbers and in various forms and shapes. Essential criteria for almost any cutting insert are its machining efficiency, tool life and the type and shape of the formed chips. Furthermore in order to exert a favorable influence on chip formation various steps have been taken in the region of the faces close to the cutting edges. However so far these steps have not been fully satisfactory.

OBJECT OF THE INVENTION

Therefore it is the object of the invention to provide a cutting insert with a particularly high machining efficiency and a long tool life, and which produces short chips.

SUMMARY OF THE INVENTION

In order to achieve this object the invention proposes that at least one bulging chip-forming element or bulge be provided on the face.

The bulge-shaped chip-forming element lifts the forming chip from the face and thereby reshapes it. As a result the chip breaks very quickly or winds itself due to the force to which it is subjected after chip removal by running against the chip-forming bulge. Further due to the hump-like chip-forming element or elements, only an extremely short contact is made between the chip and the cutting insert so that the contact surface is also extremely small. This again has a very favorable influence on the heat transfer from the chip to the cutting insert.

In a further development of the invention, only relatively few hump-like chip-forming elements are arranged on the face, which in addition are also relatively high.

BRIEF DESCRIPTION OF THE DRAWING

The above and other objects, features, and advantages will become more readily apparent from the following description, reference being made to the accompanying drawing in which.

2

Figure 5:
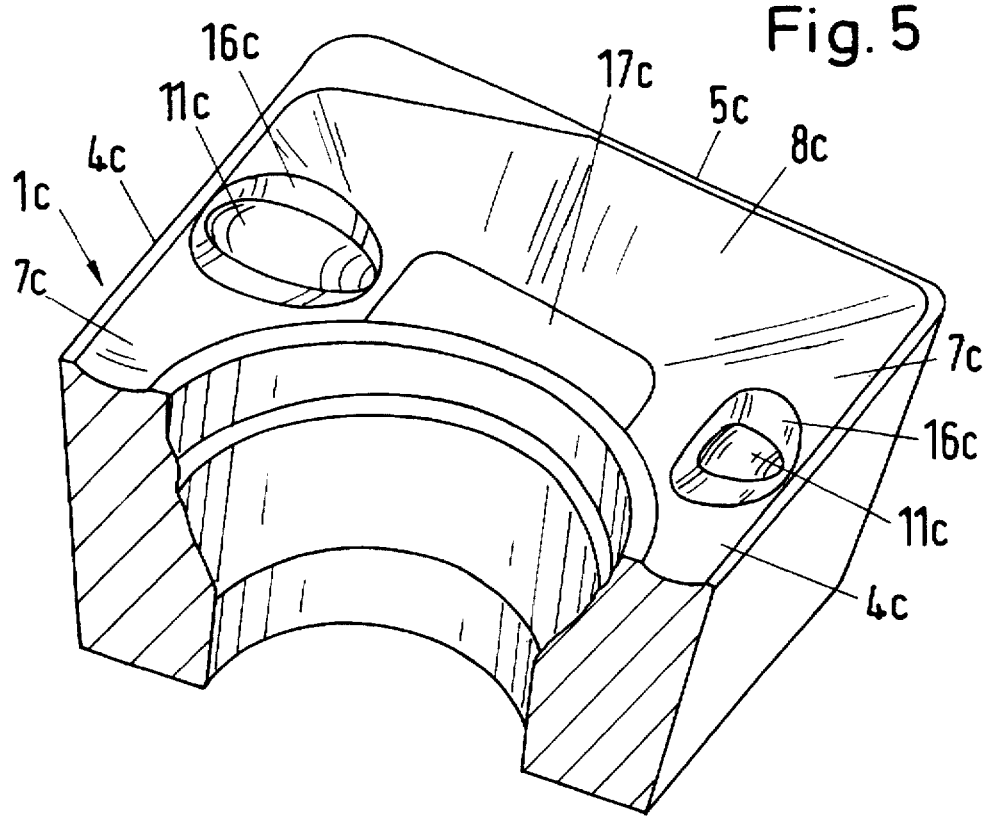
FIG. 5 is a perspective view of a further embodiment example, to a larger scale and in section.
Figure 6:
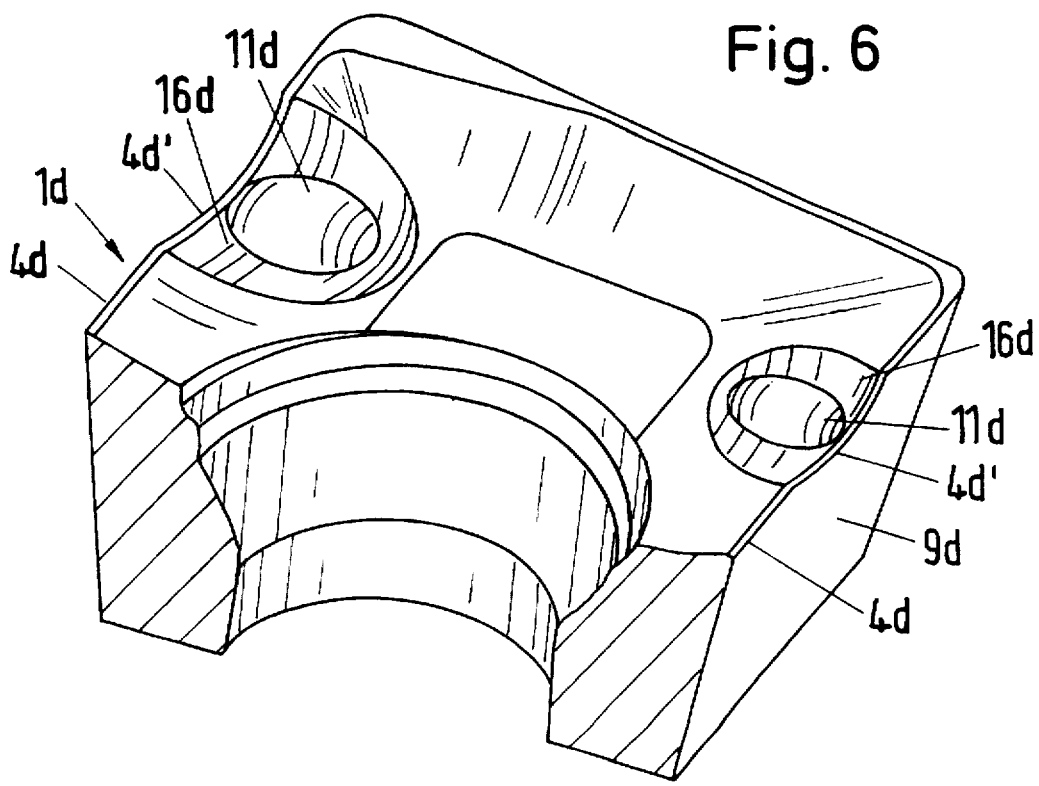
Figure 7:
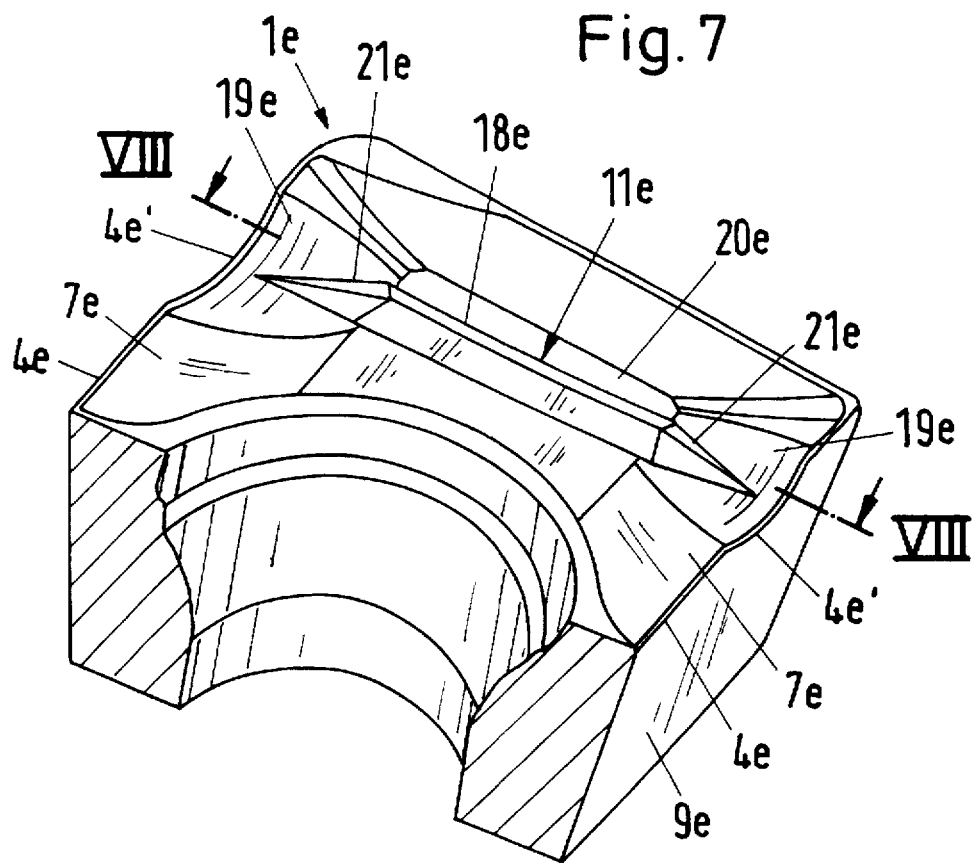

FIG. 6 is a view as in FIG. 5 of yet another embodiment;

FIG. 7 is a view as in FIGS. 5 and 6 of a final embodiment; and

Figure 8:
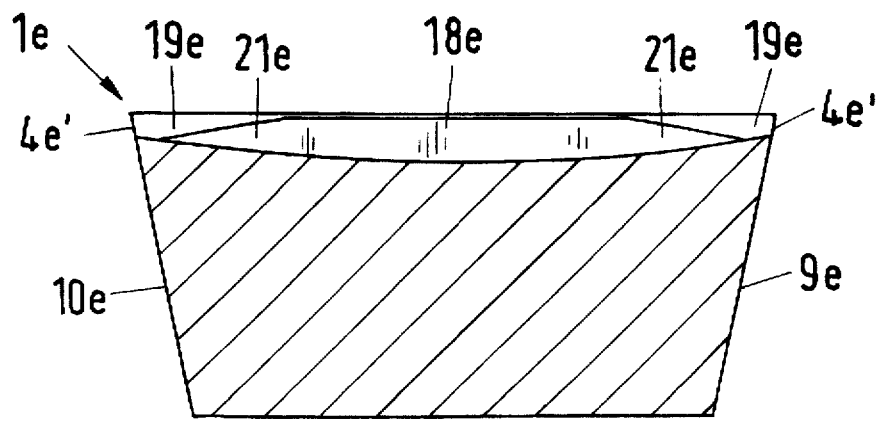

FIG. 8 is a section along line VIII—VIII in FIG. 7.

SPECIFIC DESCRIPTION

Figure 1:
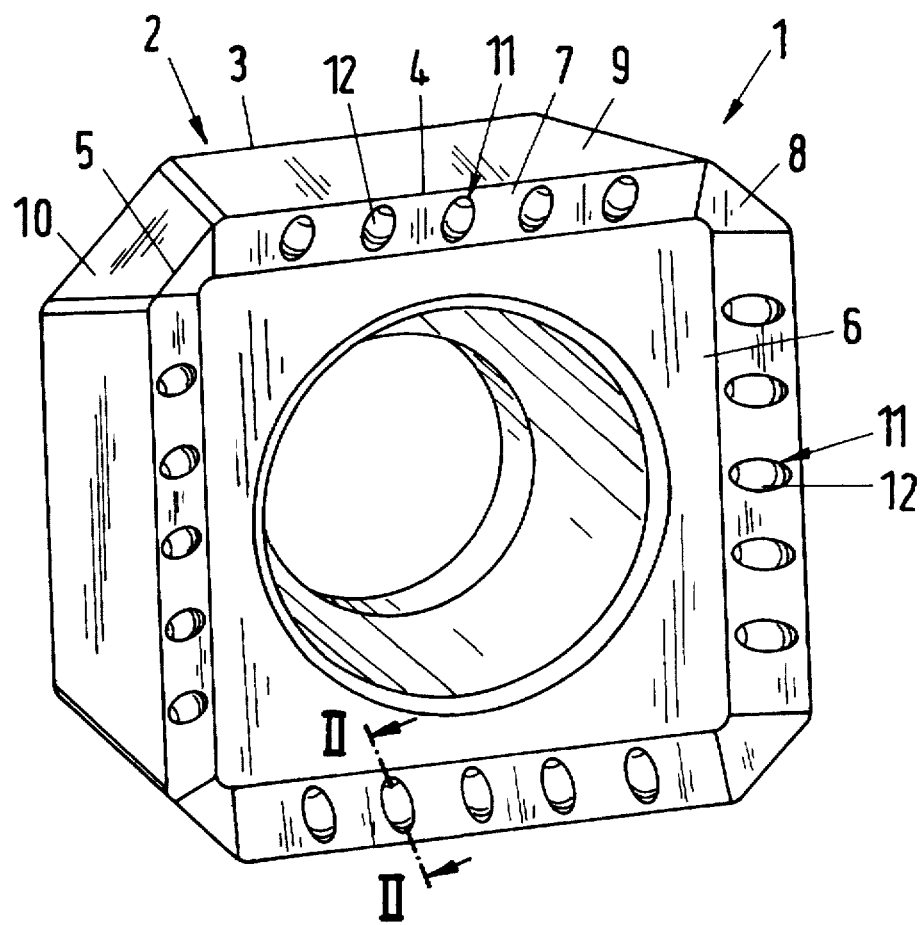
FIG. 1 is a perspective view of the cutting insert to an enlarged scale.

A cutting insert 1 according to FIG. 1 comprises a plate-shaped body 2 with a support surface 3 serving as a base, and cutting edges 4 and 5 in the region of a side 6 opposite the support surface 3. The cutting edge 4 can serve for instance as a major cutting edge and the cutting edge 5 as a minor cutting area, adjacent respectively to the faces 7 and 8, as well as the flanks 9 and 10. The faces 7, 8 are flat or are slightly curved in the form of a concave groove according to the embodiments shown in FIGS. 2 and 3.

On each of the faces 7 chip-forming elements 11 are arranged. These chip-forming elements 11 are bulge-like projections or humps 12, whose contour rises clearly above the face 7. They gradually rise from the face 7 and after reaching their maximal height, gradually descend again towards face 7. This applies to their contours as seen in the longitudinal direction of the face 7, as well as transversely thereto, whereby in any case the chip-forming elements 11 have a bigger length than width. The main axis of each hump thus extends in the moving direction of the chip.

Figure 2:
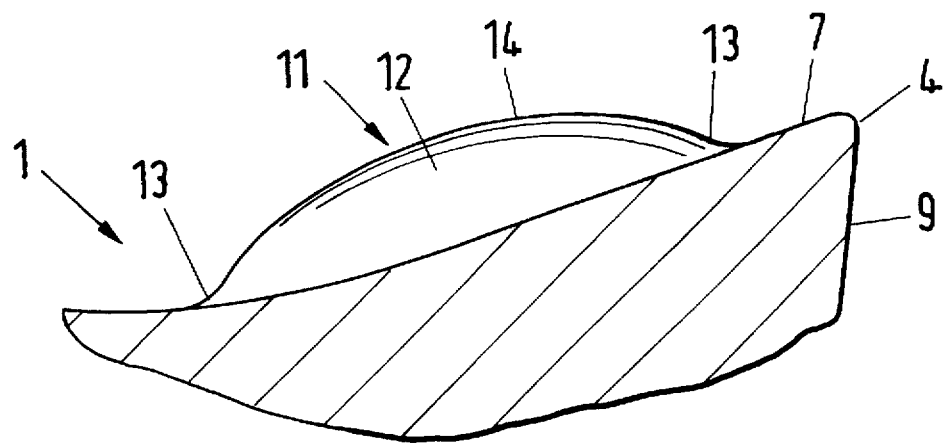
FIG. 2 is a broken away section through the cutting insert along line II—II in FIG. 1, to even a more enlarged scale.

The contour of the chip-forming element 11 is concave where its end portion 13 joins the face 7 and convex in the area of the part 14 located in between, as shown in FIG. 2. The base surface of the chip-forming element 11 is approximately ellipsoidal. All chip-forming elements 11 finally end before the respective cutting edge 4.

The number of chip-forming elements 11 on each face 7 is relatively small. According to the embodiment illustrated in FIG. 1, only five chip-forming elements 11 are arranged on each face 7 at regular intervals, and are mutually aligned.

In principle the size of the various chip-forming elements 11 arranged on a face 7 can be different, and further it is within the framework of the invention to provide more or fewer than five chip-forming elements 11 on a face 7.

The FIGS. 3 to 7 show modified embodiments, whereby the same parts are marked with the same reference numerals and by differentiating letter indexes a, b, etc.

Figure 3:
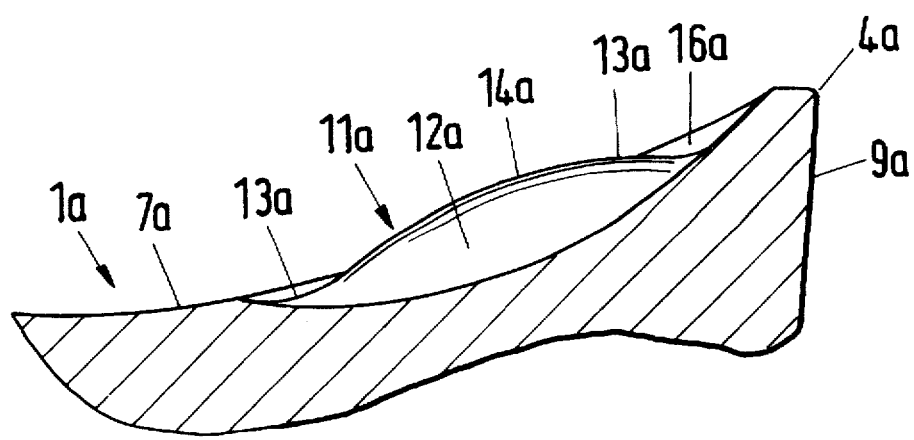
FIG. 3 is a section as in FIG. 2 through a modified embodiment.

According to the embodiment example shown in FIG. 3, the chip-forming element 11a is recessed in an annular depression 16a. Therefore the bulge-like chip-forming element 11a projects upwards not directly from the face 7a, but rises from the depression 16a. At their lower ends, each chip-forming element 11a ends inside the annular depression 16a, as well as below the level of face 7. Further each chip-forming element 11a has such a height that it projects clearly above the face 7a.

Figure 4:
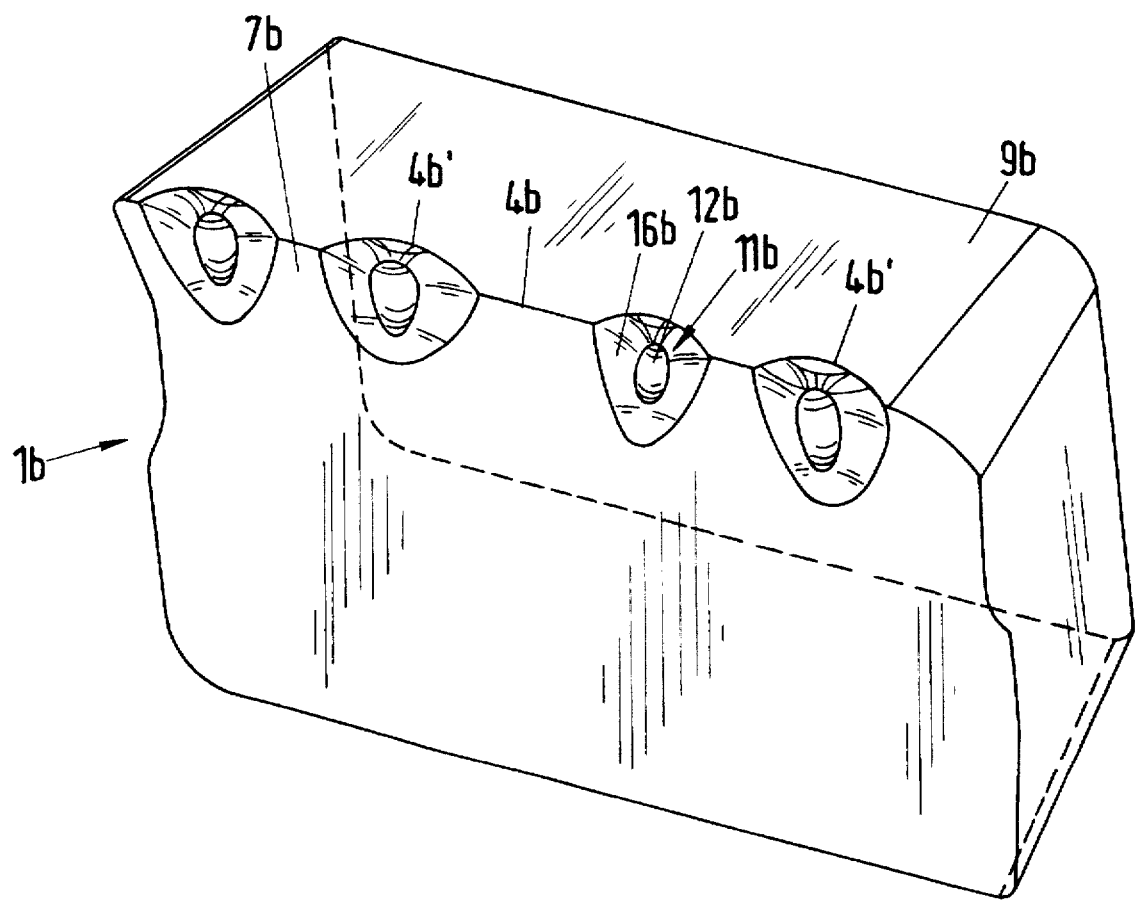
FIG. 4 is a perspective view of a further modified cutting insert on a different, also to an enlarged scale.

FIG. 4 shows a cutting insert 1b with only four bulge-shaped chip-forming elements 11b, each being further arranged in respective depressions 16b. These depressions 16b extend further up to the cutting edge 4b and end right there, in such a way that the cutting edge 4b is interrupted, respectively curves arch-like into the flanks 9b with its cutting edge segments 4b'. Inside the depressions 16b the chip-forming elements 11b are arranged as bulging projections 12b and lie in the depressions 16b like in a trough opening towards the flank 9b.

The cutting insert 1c according to FIG. 5 has a recess 17c descending from the cutting edge, respectively cutting edges 4c and 5c towards the inside and faces 7c and 8c correspondingly descending towards the inside. In the two opposite faces 7c, chip-forming elements 11c are again separately embedded in respective depressions 16c. Here too the chip-forming elements have a relatively large width and project above the face 7c.

Further it is characteristic for the cutting insert 1c that in each face 7c only very few chip-forming elements 11c are provided, i.e. according to the concrete embodiment as shown, in each face 7c only two such elements are arranged.

The cutting insert 1d according to FIG. 6 differs from the cutting insert 1c according to FIG. 5 only in that the depressions 16d serving for lodging the chip-forming elements 11d extend up to the cutting edge 4d so that the cutting edges 4d are not strictly rectilinear, but are interrupted by arch-like curves with the cutting edge segments 4d' into the flanks 9d, in the area of the depressions 16d.

Furthermore the depressions 16d are not circular, but are shaped like a trough or an elongated cavity or valley and are open towards the flanks 9d. Besides on each cutting edge 4d again only two chip-forming elements 11d and correspondingly only two depressions 16d and cutting edge segments 4d' are provided.

Finally FIGS. 7 and 8 relate to a cutting insert 1e, which has a rib 18e as a chip-forming element 11e, extending across the cutting insert 1e. The faces 7e assigned to the cutting edges 4e have trough-shaped depressions 19e, which ascend towards a centrally arranged surface 20e carrying the rib 18e and descend towards the cutting edges 4e. Therefore the cutting edges 4e are interrupted in the area of the trough-like depressions 19e or are curved in an arch-shaped manner with their cutting edge segments 4e' towards the flanks 9, in the region of the depressions 19e. The depressions 19e, shaped like troughs, cavities or valleys, descend towards the flanks 9e. Furthermore—as is the case in the cutting insert 1d according to FIG. 6—only two depressions 19e are provided at each cutting edge 4e, whereby each time only one depression 19e is shown in FIG. 7, due to the selected sectioned view.

The rib 18e serving as a chip forming element 11e has end pieces 21e, which descend from the highest level of rib 18e inside the trough-like depression 19e to the level of the latter.

We claim:

1. A cutting insert comprising a plate having a support surface, a flank rising from said surface and forming a cutting edge at a junction of said flank with a chip face, said chip face being formed with at least two trough-shaped recesses extending to and interrupting said cutting edge and spaced apart along said cutting edge, each of said recesses widening said recesses toward said edge and opening at said flank at a concave arch, a respective rounded hump-shaped chip-forming element rising from a floor of each of said recesses.

2. The cutting insert defined in claim 1 wherein each of said chip-forming elements is a rounded hump entirely received in the respective recess.

3. The cutting element defined in claim 1 wherein along said cutting edge and at most five such recesses with respective chip-forming elements are provided.

4. The cutting element defined in claim 3 wherein said plate is provided with at least two such cutting edges with respective recesses and chip-forming elements.

* * * * *